T. HAIGHT.
STEAM TRAP.
APPLICATION FILED NOV. 7, 1916.
1,333,413.
Patented Mar. 9, 1920.
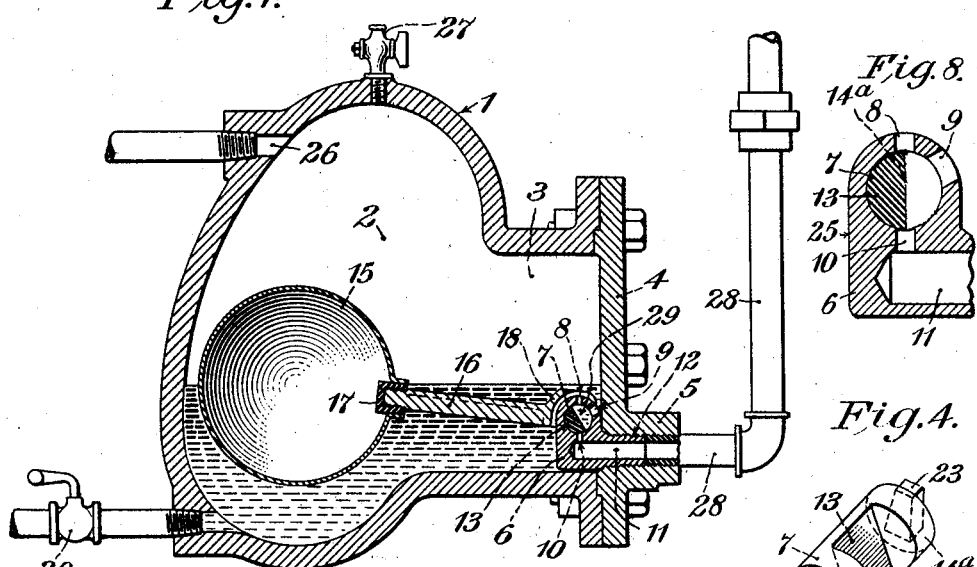
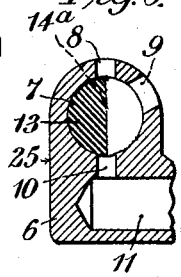
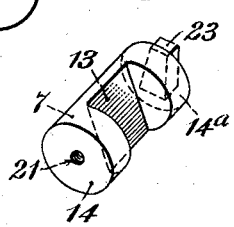
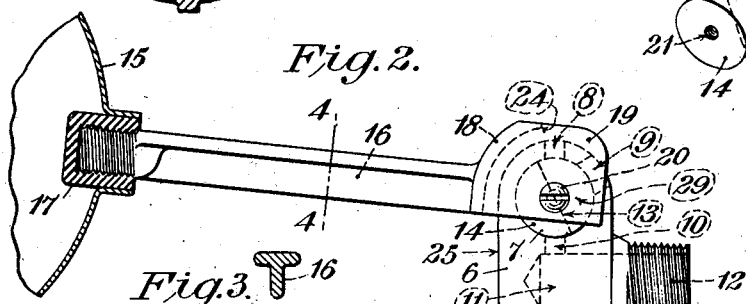
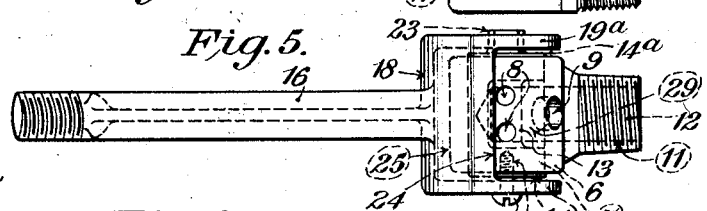
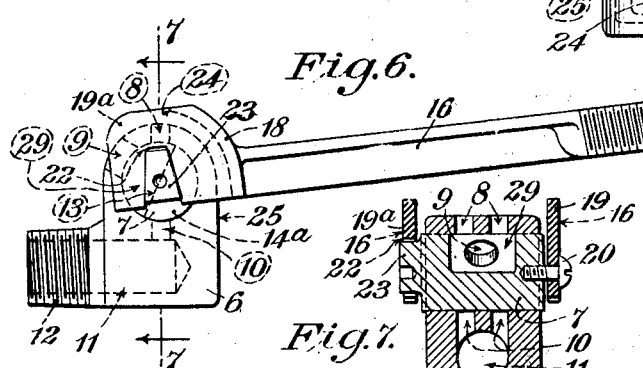
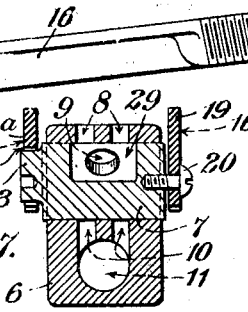
Inventor
Theodore Haight
By J. H. Gibbs
Attorney

UNITED STATES PATENT OFFICE.

THEODORE HAIGHT, OF BROOKLYN, NEW YORK, ASSIGNOR TO PLANT ENGINEERING & EQUIPMENT CO., INC., OF NEW YORK, N. Y., A CORPORATION OF NEW YORK.

STEAM-TRAP.

1,333,413.  Specification of Letters Patent.  Patented Mar. 9, 1920.

Application filed November 7, 1916. Serial No. 129,994.

*To all whom it may concern:*

Be it known that I, THEODORE HAIGHT, residing at 582 Second street, Brooklyn, New York, N. Y., and being a citizen of the United States, have invented certain new and useful Improvements in Steam-Traps, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a vertical section through my improved trap;

Fig. 2 shows the float lever and the automatically actuated trap valve in side elevation, a part of the float being shown in section at the outer end of the lever;

Fig. 3 is a transverse section through the valve lever taken on the plane indicated by line 4—4;

Fig. 4 is a perspective view of the valve removed from its casing;

Fig. 5 is a plan view of the valve and float lever illustrated in Fig. 2;

Fig. 6 is a side elevation of the float lever and automatic valve shown in Fig. 2, but showing the reverse side thereof;

Fig. 7 is a vertical transverse section through the valve and float lever, being taken on the line 7—7 of Fig. 6; and Fig. 8 is a vertical section through a portion of the valve wherein the valve and valve casing are so arranged as to form an agitating chamber.

This invention relates to traps of the type designed to be included in systems wherein vapor is conducted through suitably formed conduits. As is well understood by those familiar with such systems, a percentage of the vapor unavoidably condenses, and if the water of condensation is not extracted from the conduit system, serious damage to apparatus forming a part of such system is the almost inevitable result.

While the trap herein disclosed is admirably suited for use as a steam trap and is intended for the automatic removal of the water of condensation from live and exhaust steam lines, it may also be employed with equal efficiency in connection with evaporators, compressed air systems, high pressure gas mains, and the like.

An automatically actuated valve forms an important part of my improved trap and is given a peculiar construction by reason of which the valve not only acquires greater-than-usual wearing surface, but also becomes self-protective by preventing the accumulation of such sediment therein as may find its way into the interior of the trap.

Contributory to the elimination of sediment accumulation in the valve, is a novel multiple-inlet port in the valve casing and also the formation of a valve and valve casing which creates an internal valve chamber. The valve itself, when actuated, wipes the valve seat, clearing the latter of sediment tending to adhere thereto, and the multiple-inlet port causes the setting up of cross liquid currents which results in the avoidance of the precipitation of sediment. Moreover, an agitating chamber is formed in which the disturbed fluid washes the sediment out of the valve chamber.

A suitable water seal is provided within the trap whereby steam is always prevented from escaping, whether the automatic valve is actuated or not. The water forming this seal also assures water lubrication for such parts as have relative movement with respect to each other.

Another novel feature resides in the construction of the float lever and its means of connection with the valve proper, whereby it is impossible to assemble the parts in any but the correct manner.

Such features as have not already been referred to, but which become apparent hereinafter, are, of course, to be regarded as coming within the scope of the present invention.

Referring specifically to the parts, 1 indicates the trap casing which has an enlarged portion 2, preferably shaped to coincide with the arcuate path of travel of the float, and a cylindrical portion 3 joining the enlarged portion 2 and giving access thereto. The outer end of the cylindrical portion 3 of the trap casing is recessed and ground, the cap 4 being ground and fitted to the recessed part of trap portion 3, and also being firmly bolted to a flange outlining the open end of the trap portion 3.

Closing cap 4 is provided with a boss 5 into which is screwed the casing 6 of an automatically operated outlet valve. Said casing is provided with a horizontally disposed cylindrical bore into which is fitted a partially cylindrical valve 7, the shell of the casing 6 surrounding valve 7 being provided with a multiple-inlet port comprising a pair of preferably vertically drilled apertures 8 and another aperture 9, the axis of which is angularly disposed to the axes of apertures 8. Directly below the apertures 8 of the multiple-inlet port are arranged apertures 10 of an outlet port, which apertures open into a common outlet passage 11, said passage 11 forming the bore of a threaded extension 12 of the valve casing 6. As clearly seen in Fig. 1, threaded extension 12 of the valve casing is screwed into the boss 5 of cap 4, and, when the parts of the trap are disassembled, may remain conveniently attached to cap 4, lessening the likelihood of the valve casing becoming mislaid.

The valve 7, which is normally oscillatively mounted in the horizontal bore of valve casing 6, is of peculiar construction and comprises a substantially semi-cylindrical main portion 13 and disk-like end portions 14 and 14$^a$. It will, of course, be understood that the central or main portion 13 may be changed to have a cross section which is greater or less than a semi-circle, without affecting the character of the valve.

Valve 7 is adapted to be oscillated about its axis in response to the raising and lowering of a float 15 housed within the trap casing 1 to rise and fall with the water of condensation accumulated therein. Connection between float 15 and the oscillatory valve 7 is made through the medium of a forked float lever 16, the outer end of which is threaded into a cap 17 onto which the preferably spherical float 15 is brazed. It will be noted that the end of cap 17 that projects into the interior of float 15 is closed to prevent the possible seepage of water along the threaded outer end of float lever 16 and into the float interior.

Except at its outer end, which is cylindrical and threaded, float lever 16 is preferably T-shaped in cross section, the inner end of the T-shaped arm merging with a principally curved wall 18 which is of greater width than either the valve casing 6 or the valve 7 and from which extend rearwardly projecting plate-like arms 19 and 19$^a$. The forked end of the float lever 16, as formed by curved wall 18 and side plates 19 and 19$^a$, coöperates with the ends of the valve casing 6 as well as the disk ends 14 and 14$^a$ of the valve 7. Side plate 19 of the forked lever end is provided with an aperture through which passes a screw 20 that extends into a threaded hole 21 in the disk end 14 of valve 7. Side plate 19$^a$ of the forked lever end, as shown in Fig. 6, contains a slot 22 having inclined sides divergent as they progress toward the open side of the slot. When the float lever 16 is being assembled with the valve 7, slot 22 of side plate 19$^a$ is adapted to slip over a substantially trapezoidal lug 23 to have a wedging fit therewith.

By reason of the peculiar connection of the forked end of the float lever 16 with the previously described disk ends 14 and 14$^a$ of valve 7, it becomes impossible to incorrectly assemble the parts. Not only is it impossible to improperly attach the forked float lever 16 to the valve, but it is necessary that the valve shall be properly positioned in the valve casing in order to secure an assembly of the parts. For example, should the float lever inadvertently be turned upside down, the perforated but unslotted plate side 19 will take its position on the lug-bearing disk end 14$^a$ of the valve 7 and there will be no provision for the reception of lug 23. Should the valve 7 itself be turned about so that its lug 23 projects from the wrong side of the valve casing 6 with the narrower end of the lug uppermost, the float lever 16 may be attached, provided the valve is rotated to make the necessary accommodation for accomplishing this connection, but the transverse edge 24 of the curved wall 18 will lie against the inner vertical upright face 25 of valve casing 6 and hold the float lever 16 at an exaggerated elevation from which it cannot be lowered, making it thoroughly evident that the float lever had been improperly attached. Also, when so secured in place, the float lever 16 can not be moved down toward any of the normal positions the float 15 is capable of assuming. If the valve 7 is positioned with its trapezoidal lug 23 projecting from either side of the valve casing 6, but with the wider portion of lug 23 uppermost, said lug can not project into slot 22 of plate 19$^a$ of the forked end of float lever 16, because of the sides of slot 22 converging, preventing the admission of valve lug 23. Furthermore, under these conditions, if the valve slips around to permit the entry of valve lug 23 into lever slot 22, while the person attempting the assembly is manipulating the float lever 16, the same abnormal positioning of said float lever previously referred to will again occur when valve lug 23 extends from the wrong side of valve casing 6, and it will at once become evident that lever 16 is upside down and that the engagement of valve casing face 25 by the transverse edge 24 of curved wall 18 of lever 16 will prevent the downward movement of the float lever. There is, as a matter of fact, but one way in which the forked float lever may be attached to valve 7 and this is the intended way.

Having of necessity properly placed the valve in the horizontal bore of valve casing 6 and attached the float bearing lever 16 to said valve 7, the valve float lever 16 and float 15 may be inserted through the open end of portion 3 of trap 1, cap 4 coming into proper position and being secured in place. The trap 1, being properly included in a suitable steam or other system, steam or other vapor may enter the inlet port 26 of the trap, and it is preferable that the test cock 27 be opened to induce a strong flow of steam to first heat the trap, after which said cock may be closed.

When the float rises in response to a continued accumulation of the water of condensation, float lever 16 will rock valve 7 clockwise until the multiple-aperture outlet port 10 is uncovered, whereupon the water, under steam pressure, will pass out through this port into passage 11 and through the outlet pipe 28. A certain amount of the water of condensation will, however, remain in the trap and maintain the valve 7 and its seat in casing 6 continuously sealed, thus preventing any escape of steam.

During the rocking of valve 7 to permit the escape of water of condensation, said valve will be positioned so as to partially open both apertures 8 of the multiple inlet port and also partially both apertures 10 of the outlet port, inlet aperture 9 being fully open. In consequence of this condition, there will be a flow of water through the apertures 8 and 9 to and through both apertures of outlet port 10, angularly flowing cross currents being set up. The water current from port 9, as will be appreciated from Fig. 7, disturbs the currents from inlet apertures 8 to outlet apertures 10, and is itself deflected by contact with the flat face of valve portion 13, developing agitation in the internal valve chamber. The edges formed by the curved and flat faces of portion 13 of valve 7 clear the valve seat of sediment, and in conjunction with the fluid agitation scavenge the valve and the valve seat. Such small amounts of sediment as may enter the valve chamber between successive automatic actuations of the valve will thus be freed from adhesion to the valve and its seat and will be carried out of the valve chamber 29. The condensation again begins to accumulate until the water has risen to the level shown in Fig. 1 and the parts resume the positions shown in that figure.

As will be seen from an inspection of Figs. 5 and 7, the ends 14 and 14ª of the valve 7 project beyond the sides of the valve casing 6. Also, it will be seen that the arms 19 and 19ª do not closely or snugly engage the valve casing sides. This form of construction will permit the valve 7 to slide as well as to rotate in the bore of the casing. These two movements will tend to distribute the water of condensation over the valve for lubricating purposes.

When the trap has been in service for a long time and it is desired to thoroughly cleanse the same, the drain or blow-off valve 30 may be opened, whereupon the sediment that has accumulated in the bottom of trap 1 will be washed out, and what is not carried out by the liquid may be blown out by steam. Shutting off valve 30, the trap is then in condition to resume its usual operation.

While in the trap illustrated in the drawing the multiple-inlet port in the valve casing 6 comprises a pair of apertures 8 and a single larger aperture 9, it will, of course, be readily understood that the apertures 8 may be consolidated into a single aperture without in the least destroying the multiple-inlet port characteristic of the valve. Likewise, the pair of outlet apertures 10 may, where it is found desirable, be consolidated into a single opening. Such consolidation in either case may retain good mechanical form by partaking of the nature of a cored hole having an area equivalent to the combined areas of the separate apertures.

What I claim is:

1. In combination in a trap of the class described, a condensation-collecting receptacle, a valve structure mounted therein comprising a valve casing and a valve co-operating to form an internal valve chamber between themselves, there being a plurality of inlets to and an outlet from said chamber, means automatically operable by trap-contained condensation for actuating said valve to allow the escape of condensation from said receptacle, to prevent the total escape thereof and to establish a valve-cleansing passage through said valve structure.

2. A trap of the class described, including a condensation-collecting receptacle having a fluid inlet and an outlet, a condensation sealed valve structure mounted in said receptacle, which comprises a valve casing and a valve forming an internal valve chamber, said casing provided with inlet and outlet ports, the latter port being in communication with the receptacle outlet, and means controllable by the trap-contained condensation for actuating said valve to permit the escape of a portion of the condensation and to place certain of said ports in communication with each other to form a fluid passage through which the fluid circulates when the valve outlet is partly closed and for producing variously directed fluid currents to scavenge said valve and valve seat.

3. A steam trap valve structure which comprises a ported valve casing, a valve rotatable in the casing and having its ends projecting beyond the sides thereof, a float lever having a forked end composed of plates, one of which is provided with an aperture and the other with an open-ended trapezoidal recess, a trapezoidal lug on one end of the valve to seat in the recess, and means coöperating with the apertured plate and the other end of the valve for removably securing the lever and valve together.

4. A stemless valve having substantially a cylindrical form with the central portion cut away to form a flat face on one diameter, and a trapezoidal lug projecting axially from one end of the valve, the other end of the valve being formed to coöperate with a screw.

5. In combination in a trap of the class described, a condensation collecting receptacle, a valve structure therein comprising a valve-casing containing a substantially cylindrical bore and inlet and outlet ports, a cylindrical valve mounted in said bore having ends exposed at opposite ends thereof, a valve-actuating float-bearing lever having a forked end embracing said valve ends, means for connecting said forked lever to the valve ends so that said lever can only be attached to said valve in a single predetermined manner and position, and means for detachably securing and rigidly holding the valve and lever together.

6. In combination in a trap of the class described, a condensation-collecting receptacle, a valve structure therein comprising a valve casing provided with inlet and outlet ports and a valve mounted in said casing and having exposed ends, a valve-actuating float-bearing lever having a forked end embracing said valve ends means so connecting said lever and valve that the latter can only be attached to said valve in a predetermined manner and position, and means for detachably securing and rigidly holding the valve and lever together.

7. In combination in a trap of the class described, a condensation-collecting receptacle, a valve structure therein comprising a valve casing provided with inlet and outlet ports and an oscillatory valve mounted in said casing and having exposed ends, a valve-actuating float-bearing lever having arms embracing said valve ends, one arm being slotted, a lug extending from one of said valve ends and shaped to receive said slotted lever arm in one manner only and a different type of connection between the other valve end and the other lever arm.

8. A steam trap valve structure which comprises a valve casing, a rotatable valve mounted therein, and having a trapezoidal lug on one end, a forked float lever adapted to be removably secured to the valve, and screw means to removably secure the fork to one end of the valve.

9. A cylindrical stemless valve having one of its ends provided with a projecting trapezoidal lug whose longer axis is on one diameter, said valve being provided centrally with a recess whose bottom wall is on another diameter of the valve.

10. A steam trap valve structure which comprises a ported valve casing, a valve operable therein, and a float lever adapted to be removably secured to the valve in but one predetermined manner and position.

11. A steam trap valve structure, which comprises a ported casing, a valve operable therein, a float lever engageable with the ends of and adapted to be connected to the valve in but a single predetermined manner and position of the lever, and means for detachably securing the lever to one end of the valve.

12. A valve structure, which comprises a ported valve casing, a rotatable valve mounted therein to control certain of the ports and capable of sliding transversely of the casing, and a float lever coöperating with both ends of the valve and secured to one end thereof, said lever being adapted to impart movement to the valve, one end of the lever being approximately U-shaped and the transverse portion thereof being curved to serve as a cover for the casing during certain positions of the float lever.

13. A valve mechanism which comprises a ported valve casing, a rotatable and slidable valve mounted therein, said valve having a wedge-shaped lug on one end, a float lever having one of its ends bifurcated to form arms that are adapted to engage with the ends of the valve, one of the arms being provided with a recess having a configuration similar to the lug for engaging therewith, and screw means for securing the other arm to the other end of the valve for retaining the lever and valve in operative position.

14. A device of the class described comprising a valve structure having an open-ended cylindrical bore provided with radial ports spaced circumferentially, a stemless valve insertible into the bore and having one end flat and the other end provided with a wedge-shaped projecting lug, a forked float lever, said lever being adapted for engagement with the ends of the valve in a single predetermined manner by having one of the arms of said lever provided with an open-ended wedge-shaped slot to coöperate with the lug, and means for detachably connecting the lever to the valve through a coöperative action with the flat end of said valve.

15. A device of the class described comprising a valve casing having an open-ended cylindrical bore provided with radially arranged ports spaced circumferentially, one of said ports serving as an outlet, a stemless rotatable valve insertible in said bore, said valve having disk-like ends, one of which is flat and provided with a threaded hole, and the other end having a wedge-shaped lug projecting axially therefrom, the intermediate portion of the valve being cut away to form a flat face on a diameter thereof, a float lever having a forked end composed of substantially parallel flat plates connected by a curved wall forming the transverse portion of the fork, one of said plates being provided with a hole adapted to register with the threaded hole in the end of the valve, and the other plate provided with a slot adapted to slidably engage the lug in one way only, and screw means passing through the hole in the lever plate and into the threaded hole of the valve for detachably holding the lever and valve together.

16. A device of the class described comprising a valve casing provided with a valve bore therethrough, said casing being provided with ports, a rotatable valve mounted in said bore, and adapted to control certain of said ports, a float lever having a yoke at one end, which yoke is composed of spaced side plates joined and spaced by a curved wall, and means for detachably securing and rigidly holding the lever and valve together, said plates and curved wall serving to partially inclose said valve and casing.

17. A device of the character described comprising a ported valve casing, a cylindrical, stemless, rotatable valve mounted therein and adapted to control certain of said ports, a float lever having one of its ends formed as a fork, the arms of which are adapted to be connected to the ends of the valve, and means carried by said valve and said arms of the fork for detachably securing and rigidly holding said valve and lever together in but one predetermined relation of valve and casing.

18. A device of the character described comprising a ported valve casing, a rotatable valve in said casing, a unitary forked end lever adapted to be connected to the ends of the valve with the valve in but a single and predetermined relation to the casing, and means for retaining the valve and lever in their connected position.

19. A device of the character described comprising a ported valve casing, a rotatable valve in said casing, a forked lever, unitary coöperative means carried by the lever and valve for detachably uniting said valve and lever in but one predetermined manner and removable means acting to maintain the coöperative union.

20. A valve casing having an open-ended bore therethrough serving as a valve chamber, a threaded nipple outlet extending from the casing transversely of the vertical diameter of the bore and communicating therewith, ports in said casing, certain of said ports forming outlet ports having communication with the nipple, another port communicating with the bore and on another diameter thereof, the upper portion of the wall of the casing surrounding the bore being substantially concentric thereto, a rotatable valve mounted in said bore to control certain of said ports and a lever operably connected to the ends of the valve for rotating the same and having a hood portion adapted to cover a portion of said casing and being substantially concentric therewith.

21. A valve having cylindrical end portions and a semi-cylindrical intermediate portion, one of the ends being substantially flat and provided with a threaded hole and a lug extending transversely across the major portion of the other end, said lug being formed with sides, two of which tend to converge toward each other.

In witness whereof I have hereunto set my hand.

THEODORE HAIGHT.